Nov. 24, 1959  W. A. CERVINI  2,914,332
DRILL ADAPTOR
Filed March 25, 1955
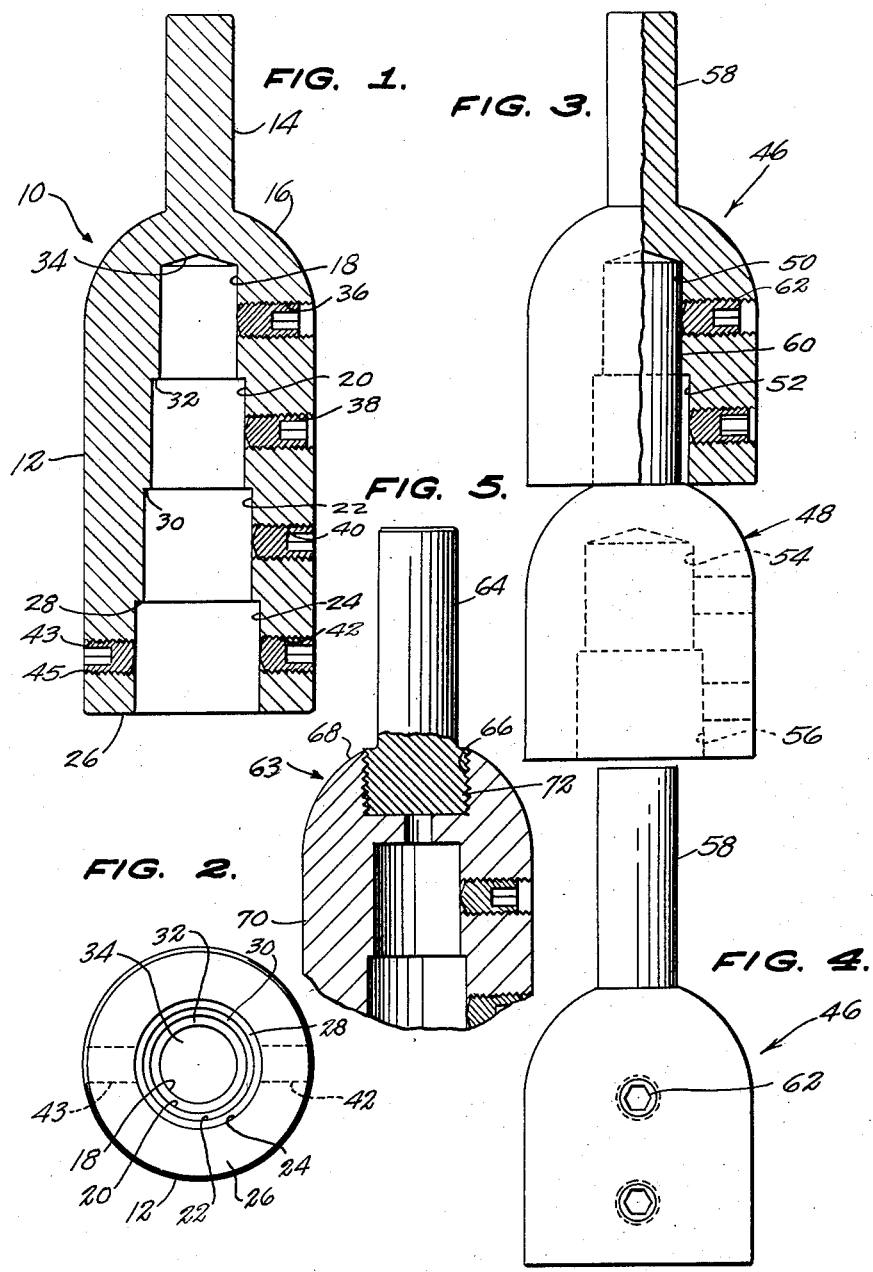
INVENTOR.
WARREN A. CERVINI,
BY
McMorrow, Berman & Davidson
ATTORNEYS.

United States Patent Office 2,914,332
Patented Nov. 24, 1959

2,914,332
DRILL ADAPTOR

Warren A. Cervini, New Orleans, La.

Application March 25, 1955, Serial No. 496,763

1 Claim. (Cl. 279—83)

This invention relates to an improved drill bit adaptor for drills.

It is the primary object of this invention to provide a drill bit adaptor for drills especially of the motor driven type, which enables a drill to utilize drill bits of different sizes larger than the maximum chuck opening of the drill without altering the drill bit shank. At present, if a drill bit has a diameter larger than the maximum chuck opening of the drill with which its use is desired, it is necessary to turn down the drill bit shank to a diameter receivable in the chuck. This increases the cost of the drill bits as well as limiting the usefulness of the drill. Therefore, the adaptor of this invention proposes to increase the range of drill bit sizes useable with a drill of a given maximum chuck opening.

Another object is to provide an adaptor of this kind, which is of simple construction, capable of rugged usage, and securely connectible to the drill bit with which it is to be used.

Other objects and advantages will become apparent from a consideration of the following detailed description, forming the specification, and taken in conjunction with the accompanying drawings, in which:

Figure 1 is a vertical cross sectional view medially through one form of the drill bit adaptor embodying this invention;

Figure 2 is a bottom plan view of Figure 1;

Figure 3 is a side elevational view, partially broken away, of another form of the drill bit adaptor;

Figure 4 is a side elevational view of one of the sections of the adaptor shown in Figure 3; and Figure 5 is a vertical cross sectional view medially through still another form of drill bit adaptor partly in side elevation.

With continued reference to the drawings, there is shown, in Figures 1 and 2, a drill bit adaptor generally designated 10. The adaptor 10 comprises a cylindrical body 12 of high-grade tool steel. A reduced cylindrical drill chuck engaging stem 14 is formed integrally with the body 12 and extends axially outwardly from one end 16 of the body. The end 16 may be rounded as shown in Figure 1.

A longitudinal series of axial sockets 18, 20, 22 and 24 of successively larger diameters are formed in the body 12 and open through the body end 26. The sockets increase in diameter from 18 to 24, with the largest diameter socket 24 opening through the end 26 of the body 13 remote from the stem 14. Each of the sockets has a diameter greater than the diameter of the stem 14 which is adapted to be received in the chuck of an associated drill (not shown) in the usual manner, with the chuck having a given maximum opening less than the diameter of the smallest socket 18.

Shoulders 28, 30 and 32 between the sockets form the inner ends of the sockets 24, 22, 20 and 18, respectively, as shown in Figure 1 and provide stops for the ends of the shanks of drill bits inserted in the sockets. The inner end of the socket 18 is closed and cone-shaped, as at 34, to form a stop for the shank end of a drill bit of a size fitting in the socket 18.

Threaded radial bores 36, 38, 40 and 42 are provided transversely through the side wall of the body 12 and communicate with the respective sockets 18, 20, 22 and 24, and Allen head screws 44 are threaded in the bores to lockingly engage the shanks of the drill bits in the sockets. Thus, a drill bit shank received in one of the sockets can be secured therein by tightening the screw 44 into engagement therewith. An additional threaded bore 43 is provided for the socket 24 in diametrical alignment with the bore 42, and an additional Allen head screw 45 is threaded in the bore 43.

In the form of the invention shown in Figure 3, upper and lower adaptor sections generally designated 46 and 48, respectively, of construction identical to adaptor 10 except for having only two sockets, form an adaptor. The diameters of the sockets 50 and 52 of the upper section 46 are smaller than the graduated sockets 54 and 56 of the lower adaptor section 48. Thus, the upper adaptor section 46 can be used with a drill having a chuck whose maximum diameter will receive the stem 58 of the upper adaptor section 46 to enable a user to utilize drill bits of a size fitting the sockets 50 or 52. It, however, it is desired to use drill bits of sizes larger than the sockets 50 and 52, the stem 60 of the lower adaptor section 48 is of a diameter to be received in the socket 50 of the upper section 46 and be secured therein by set screw 62. This enables the user to utilize drill bits of larger diameter than can be accommodated in the sockets 50 and 52.

The drill bit adaptor shown in Figure 5, and generally indicated at 63, is similar in construction to adaptor 10 except for the manner in which the stem 64 is connected to the rounded end 68 of the socket body 70. An internally threaded recess 66 is formed centrally in the end 68 to threadingly receive an enlarged externally threaded boss 72 on the stem to releasably secure the stem to the socket body. Thus, the graduated sockets in the socket body can be used with drills having different size chucks by merely replacing the stem 64 with a similar stem of suitable diameter.

While there is shown and described the preferred embodiment of the invention, it is to be understood that the structure is susceptible to change and modification within the scope of the invention and therefore should be limited only by the scope of the claim appended hereto.

What is claimed is:

A drill bit adaptor comprising a socket body section having an axial drill chuck stem on one end and having another end, a series of axial sockets in said socket body section, said sockets being graduated in diameter from said one end of the socket body section to said other end thereof with the larger socket opening through said other end of the socket body section and with the smallest socket axially spaced from said one end of the socket body section, adjacent sockets defining socket ends therebetween and the material of the socket body section defining a closed end for the smallest socket, said socket body section having an upper socket body section and a lower socket body section substantially similar to said first section, said second section having a stem of a diameter removably engaged in the smallest socket of said first section and sockets larger in diameter than the sockets of the first section, and a screw in the smallest socket of the first section threaded against the stem of the second section.

References Cited in the file of this patent

UNITED STATES PATENTS

| 1,252,335 | Foote | Jan. 1, 1918 |
| 1,647,802 | Josef | Nov. 1, 1927 |
| 1,684,582 | Hoaglund | Sept. 18, 1928 |
| 2,338,095 | Campbell | Jan. 4, 1944 |